(No Model.)
H. PLADECK.
CHILD'S CARRIAGE.
No. 414,577. Patented Nov. 5, 1889.
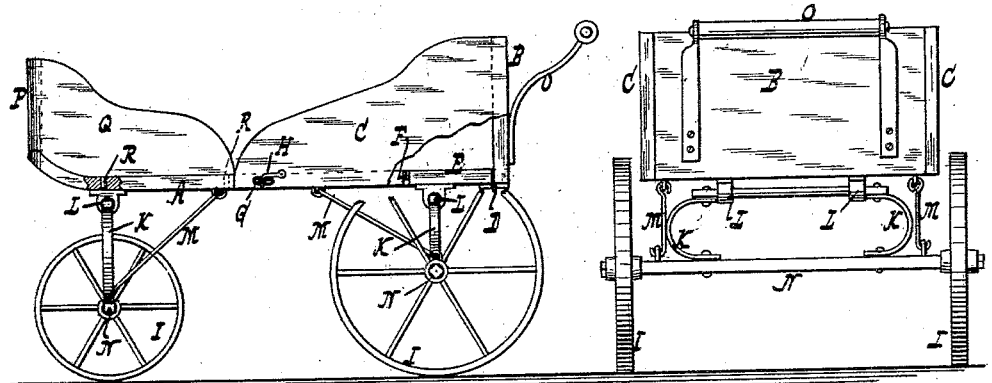
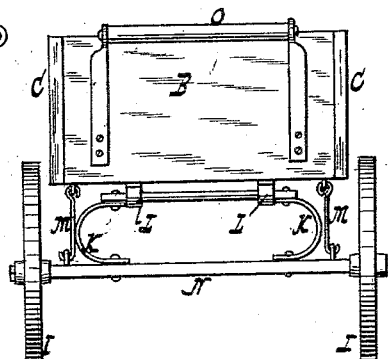
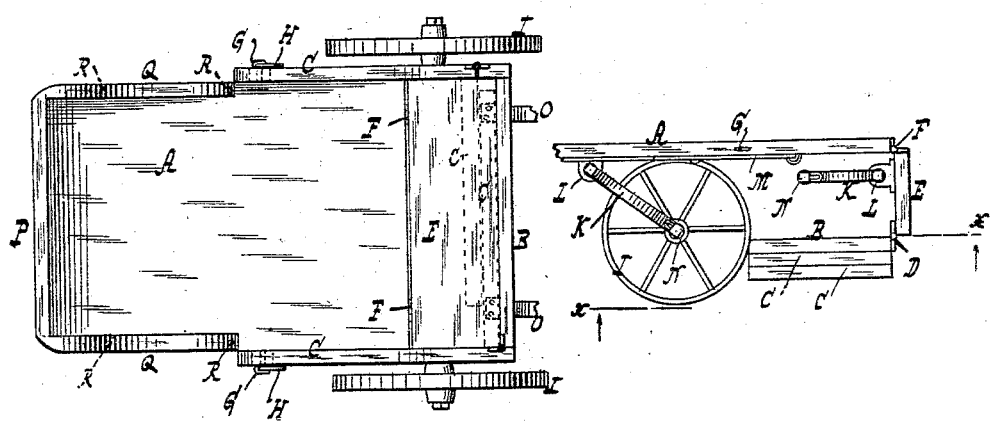
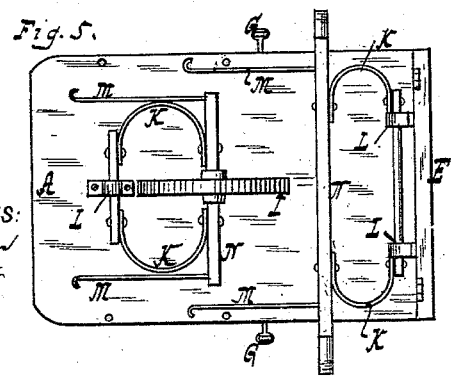
WITNESSES:
William Miller
Edward Wolff
INVENTOR:
Hugo Pladeck
BY
Van Santvoord & Stauff
ATTORNEYS

UNITED STATES PATENT OFFICE.

HUGO PLADECK, OF NEW DURHAM, NEW JERSEY.

CHILD'S CARRIAGE.

SPECIFICATION forming part of Letters Patent No. 414,577, dated November 5, 1889.

Application filed July 18, 1889. Serial No. 317,892. (No model.)

*To all whom it may concern:*

Be it known that I, HUGO PLADECK, a subject of the King of Saxony, residing at New Durham, in the county of Hudson and State of New Jersey, have invented new and useful Improvements in Babies' Carriages, of which the following is a specification.

This invention relates to a baby-carriage which can be folded, so as to occupy but little space; and the invention consists in the details of construction set forth in the following specification and claims, and illustrated in the accompanying drawings, in which—

Figure 1 is a side elevation of a carriage open or ready for use. Fig. 2 is a rear view of Fig. 1. Fig. 3 is a plan view of Fig. 1. Fig. 4 shows the carriage folded or knocked down. Fig. 5 is an inverted plan view of a carriage having the spring folded or knocked down.

Similar letters indicate corresponding parts.

In the drawings, the letter A indicates the bottom of the carriage.

B is the back, and C C are the sides. The back B is hinged or jointed at D to a back-support E, hinged or jointed at F to the bottom A. The sides C C are jointed to the back B. The fastenings G H hold the sides to the bottom. The fastenings G H can be readily made by eyes G, secured to the carriage-bottom, and by hooks H, secured to the sides. When the fastenings G H are released and the back-support E swung to the position shown in Fig. 4, the back and sides can be folded together under the bottom A, Fig. 4.

The wheels I have their axles N fixed to springs K, jointed at L, beneath the bottom of the carriage. When the wheels are in the position shown in Fig. 1, the braces M hold the axles and springs in position. The hind wheels are detachable from their axle, and by detaching said wheels from the axle and releasing the braces M, the spring and axle for the hind wheels can be folded snug against the carriage-bottom. The releasing of the braces will also allow the front wheel, with its axle and spring, to be swung against the carriage-bottom. As the front wheel is generally small, and does not occupy much space when in the position shown in Fig. 4, the front wheel need not be made detachable from the spring; but said front wheel can be made detachable, if desired. Any suitable well-known means for making the wheels attachable and detachable can be employed. By having the springs K jointed beneath the carriage-bottom the entire weight of the structure will be brought directly upon the springs, so that the springs and bottom are not likely to become detached from one another.

A handle O can be slipped into suitable eyes or holders on the carriage or secured by screws or other means, or the upper part of the back B can be formed so as to furnish a handle or grip surface, if desired.

In place of having only one front wheel, two front wheels made detachable from the axle, the same as the hind wheels, can be employed, if desired. In place of making the wheels absolutely detachable, they can be supported on a hinged or swinging part of the axle, so that when the carriage is folded the wheels can be turned so as to lie in a plane parallel with the plane of the back, Fig. 4.

At the foot of the carriage may be placed a foot-board P, having sides Q Q. The foot-board and sides Q may be held in place by pins or dowels R, entering suitable eyes or holes in the bottom A. The dowels R hold the foot-board and sides Q firmly in place, while leaving the same free to be readily removed from the bottom A when the carriage is to be folded.

What I claim as new, and desire to secure by Letters Patent, is—

1. A baby-carriage having its bottom provided with a swinging back-support E, a back jointed to said support E, sides jointed to said back, and fastenings for securing the sides to the carriage-bottom, substantially as described.

2. A baby-carriage having front and rear wheel-axles N, provided with springs K, hinged, respectively, to the front and rear end portions of the carriage-bottom A, in combination with a pair of front and rear brace-rods M, hinged to the under side of the carriage-bottom at their upper ends and respectively engaging the wheel-axles at their lower ends, substantially as described.

In testimony whereof I have hereunto set my hand in the presence of two subscribing witnesses.

HUGO PLADECK.

Witnesses:
WILLIAM C. HAUFF,
ERNST F. KASTENHUBER.